Sept. 23, 1958 G. B. BOOTH ET AL 2,853,667
ELECTRICAL FEEDBACK CONTROL SYSTEMS
Filed Dec. 27, 1954 6 Sheets-Sheet 1

INVENTORS
GALT B. BOOTH
GERALD K. REEN
BY
Byerly, Townsend & Watson
ATTORNEYS

INVENTORS
GALT B. BOOTH
GERALD K. REEN
BY
ATTORNEYS

United States Patent Office 2,853,667
Patented Sept. 23, 1958

2,853,667
ELECTRICAL FEEDBACK CONTROL SYSTEMS

Galt B. Booth, Branford, and Gerald K. Reen, Woodbridge, Conn., assignors, by mesne assignments, to Textron Inc., a corporation of Rhode Island Application December 27, 1954, Serial No. 477,752

12 Claims. (Cl. 318—127)

This invention relates in general to feedback control systems and more particularly to feedback control systems subject to large external disturbances.

The invention will first be described as applied to a very general feed back control system. The deficiencies of the prior art will be noted and the application of the invention to overcome these deficiencies illustrated.

To clarify the invention, it will then be described as applied to various special cases; first to a simple speed controller, and secondly to a complex control system used for the control of the amplitude of vibratory motion of a vibration exciter.

A feedback control system may be described in simple terms as a system which utilizes the difference between the actual value of the output and the desired value of the output to initiate corrective action to bring the difference to zero. Such a control system has an output which is to be controlled, a reference to which the output may be compared, feedback control elements to convert the output to a convenient form for comparison, a differencing network in which the actual comparison takes place, and forward control elements which adjust the output in response to the difference. The output to be controlled is ordinarily the output of a power element, which is considered as one of the forward control elements.

A transfer function may be defined for each element of the control system as the ratio of its output to its input. Although such transfer functions are usually time functions or functions of frequency, for most of the following discussion, the transfer function at any specific frequency will suffice for the understanding of the invention and, therefore, the functional relationship to frequency is not emphasized.

The loop gain of such a feedback control system may be described as the product of the transfer functions of the forward control elements, including the power element, and the feedback control elements. In general, large loop gain provides rapid control action and accurate operation but makes stabilization of the system difficult.

The maximum usable value of loop gain is limited to a value below that at which oscillations or hunting occur. Such oscillations are the result of inherent time lags in either the electrical or mechanical components of the feedback control system which at some frequency result in regenerative rather than degenerative feedback.

Disturbances from outside a control system, such as loads being applied to the output, supply voltage variations, temperature changes, etc., may drastically change the transfer function of one or more of the control elements, in particular the transfer function of the main power element. Such a change in the transfer function of one of the control elements normally causes a proportionate change in the loop gain, affecting the accuracy, the stability, and the speed of response of the system.

If a feedback control system is subject to such disturbances, it has been the practice in the prior art to stabilize the system for the largest value of loop gain which might exist. Since during most of the time the system is operating the loop gain will be much less than this maximum allowable value, the performance of the system will be less than optimum, and both accuracy and speed of response will suffer.

The restriction on the maximum loop gain for stability reasons and the advantage of high loop gain to obtain accuracy and speed of response indicate the desirability of a feedback control system having a constant loop gain independent of external disturbances. This is accomplished by our invention.

The static error of a feedback control system may be defined as the difference between the actual value of the output and the desired value of the output which prevails when the input and the external disturbances are not changing with respect to time. Our invention is a powerful new tool for the elimination of static error.

The static error of a feedback control system of the proportional type, in which the loop gain is not a time function and in which category belong most regulators, speed regulators, voltage regulators, etc., is usually inversely proportional to the loop gain of the system. The static error of the proportional type of feedback control system in the prior art form can be minimized but not eliminated by the use of high loop gain. The application of our invention to this type of control system completely eliminates the static error, without the use of large loop gain. The application of our invention to proportional control systems is particularly useful in those systems wherein time lags would cause hunting if high loop gain were applied.

The static error of a feedback control system of the integrating type, in which the control loop contains a single time integrating forward control element and in which category belong most servomechanisms, is theoretically zero because the output is proportional to the time integral of the past values of the static error and if given time will approach an exact correspondence with the input. Although the static error characteristics of the integrating system are better than those of the proportional system, the additional time lag caused by the integrator makes stabilization difficult. The use of our invention in this type of control system retains the good static error characteristics, and, at the same time simplifies stabilization by controlling the loop gain.

Since the high static error of the proportional control system has been the principal reason for using the integrating type, and since an integrating type system may usually be converted to a proportional type by the addition of a simple feedback loop, and since the integral type system is much more difficult to stabilize than the proportional type, our invention will extend the advantages of the proportional type control system to applications in which integrating systems have heretofore been used, resulting in an increase in both accuracy and speed of response.

An object of the invention is to provide for maintaining the loop gain of a feedback control system constant.

Another object of the invention is to provide for maintaining the loop gain of a feedback control system independent of external disturbances.

Another object of the invention is to provide for making a proportional feedback control system a zero static error device.

Another object of the invention is to provide for automatically controlling the amplitude of vibratory motion of a vibration exciter both rapidly and accurately.

Another object of the invention is to provide for accurately controlling the amplitude of vibratory motion independent of resonances in the vibrating members.

Another object of the invention is to provide for accurately and rapidly controlling the amplitude of vibratory motion independent of supply voltage variations.

Another object of the invention is to provide for accurately and rapidly controlling the amplitude of vibratory motion without requiring frequent manual readjustments of loop gain.

In accordance with the invention, these objects are attained by combining an internal feedback path containing a multiplicative device with an ordinary feedback control loop. In an ordinary feedback control loop, a voltage or other signal from the output side of a power element which is to be controlled is fed back to a differencing or subtractive network to obtain a difference signal which is led to the input side of the power element. In accordance with our invention, a multiplying or fractioning device, for example, a potentiometer, is inserted between the output of the subtraction device and the input side of the power element so that only a fraction of the difference signal is used to determine the input to the power element. A feedback connection extends from the input side of the power element to the multiplying device so that the portion of the difference signal used is adjusted simultaneously and proportionately to the adjustment of the input to the power element. This, we have discovered, has the effect of making the loop gain of the main feedback loop constant, and, it has the effect of making the system output independent of external disturbances and making the system output have zero static error.

A further feature of our invention consists in introducing an externally operated fractioning device, such as a potentiometer, between the output side of the power element and the subtraction device. This provides means for making desired changes in the controlled output of the power element without changing the over-all loop gain of the feedback control loop. A mathematical demonstration that the invention produces these desirable results is hereinafter contained.

Other objects and a fuller understanding of the invention may be had by referring to the following description and claims taken in conjunction with the accompanying drawings in which:

Fig. 9 shows a section view of the autotransformer connected to the gear box shown by a section on line 9—9 of Fig. 7; and Fig. 9a shows a section on line 9a—9a.

Figure 1:
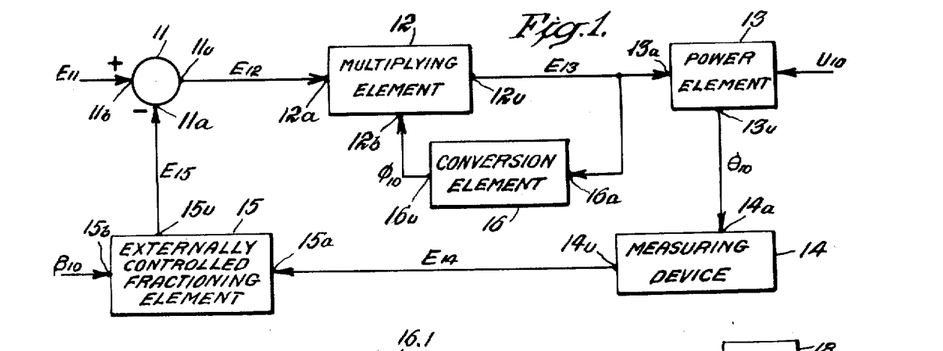
Fig. 1 shows a block diagram of a generalized form of feedback control system to which the invention is applied.

Fig. 1 indicates a feedback control system for a power element 13 which may be an electric motor or any other power element, subject to external disturbances $U_{10}$. A feedback path extends from the output $13u$ of the power element 13 to apply a signal $E_{15}$ to one of the inputs $11a$ of a subtraction device or comparison network 11. To the other input $11b$ of this device is applied a constant level signal $E_{11}$. The difference signal $E_{12}$ from the output $11u$ of the subtraction device is ordinarily led to the input $13a$ of the power element 13 to determine the amount or level of the signal at input $13a$. The feedback path from the power element output $13u$ to the subtraction device input $11a$ ordinarily includes a measuring device 14 of some sort which measures the speed or some other characteristic $\theta_{10}$ of the power element 13 applied to its input $14a$ and produces at its output $14u$ a signal $E_{14}$ proportional to the measured quantity which is fed to the subtraction device input $11a$ as signal $E_{15}$.

In applying our invention to such a feedback control system, we insert a multiplying element 12, such for example as a potentiometer, between the output of the subtraction device 11 and the input side of the power element 13 so that only a fraction $E_{13}$ of the difference signal $E_{12}$ is led to the input side of the power element 13; and we insert an internal proportional feedback path from the input side of the power element 13 to the multiplying device. Thus one input $12a$ of the multiplying element 12 is connected to the output $11u$ of the subtraction device 11 and the multiplying element output $12u$ is connected to power element input $13a$ while there is a feedback connection from power element input $13a$ to the other multiplying element input $12b$. If, for example, the multiplying element 12 consists of a potentiometer or similar device which is adjusted by mechanical movement, the feedback path from power element input $13a$ to multiplying element input $12b$ contains a conversion element 16 for converting an electrical signal to a proportional mechanical movement with its input $16a$ connected to power element input $13a$ and its output $16u$ connected to multiplying element input $12b$ for converting the signal $E_{13}$ into a proportional mechanical movement $\phi_{10}$. An externally controlled fractioning element 15 is provided with an input $15a$ connected to the measuring device output $14u$ and its output $15u$ connected to the difference network input $11a$ and an input $15b$ for applying an external adjustment $\beta_{10}$ to the output $\theta_{10}$ of power element 13.

The general system of Fig. 1 may be analysed in terms of a set of seven basic equations. The first four of these represent features which are well known, the fifth, sixth and seventh describe features of this invention, and in all of these equations $E_{11}$, $E_{12}$, $E_{13}$, $E_{14}$, $E_{15}$ and $\phi_{10}$ represent signals at the points designated on Fig. 1, $E_{11}$ being a constant signal.

The comparison device 11 produces an output proportional to the difference of two inputs, and therefore may be represented by the equation:

$$E_{12} = E_{11} - E_{15} \qquad (1.01)$$

The multiplying element 12 is described by the equation:

$$E_{13} = C_A E_{12} \qquad (1.02)$$

where $C_A$ represents the control variable.

The power device 13 produces an output variable $\theta_{10}$ from an input of $E_{13}$ and is subject to external disturbances $U_{10}$. It may be described by the equation:

$$\theta_{10} = F(U_{10}) \cdot E_{13} \qquad (1.03)$$

where $F(U_{10})$ is a function of $U_{10}$.

The measuring device 14, which is frequently necessary to convert the output variable $\theta_{10}$ to a measurable form, may be represented by the equation:

$$E_{14} = C_M \theta_{10} \qquad (1.04)$$

where $C_M$ is a constant of proportionality.

The externally controlled fractioning element 15 is introduced to vary the fraction of $E_{14}$ fed to the subtraction device 11 according to the equation:

$$E_{15} = C_S \beta_{10} E_{14} \qquad (1.05)$$

where $C_S$ is a constant of proportionality of the device and $\beta_{10}$ represents the position of the externally controlled fractioning element 15.

A conversion element 16 in the feedback path between the power element input $13a$ and the multiplying element input $12b$ is frequently necessary to convert the signal $E_{13}$ to a mechanical displacement, for example where multiplying element 12 is a potentiometer requiring mechanical adjustment, and may be represented by the equation:

$$\phi_{10} = C_V E_{13} \quad (1.06)$$

where $C_V$ is a constant of proportionality and $\phi_{10}$ represents the mechanical displacement.

The mechanical displacement $\phi_{10}$ produced by conversion element 16 acts upon the multiplying element 12 to vary its gain according to the equation:

$$C_A = C_{AO} \phi_{10} \quad (1.07)$$

where $C_{AO}$ is a constant.

The operation of the general system in the form of the prior art may be described by assuming that $\beta_{10}$ of Equation 1.05 is a constant and that the mechanical displacement $\phi_{10}$ produced by the conversion element 16 is not operative to vary $C_A$ and therefore $C_A$ is also constant. Equations 1.01 through 1.05 above may then be solved for $\theta_{10}$, giving the value of the output variable of the system:

$$\theta_{10} = \frac{E_{11}}{C_M C_S \beta_{10}} \times \frac{1}{1 + \frac{1}{C_A F(U_{10}) C_M C_S \beta_{10}}} \quad (1.08)$$

The loop gain $G_P$ of the prior art system is the ratio of $E_{15}$ to $E_{12}$ and therefore may be defined as:

$$G_P = \frac{E_{15}}{E_{12}} \quad (1.09)$$

Solving Equations 1.01 through 1.05 for this ratio gives:

$$G_P = C_A F(U_{10}) C_M C_S \beta_{10} \quad (1.10)$$

which appears as the denominator of the second term in the denominator of Equation 1.08.

This prior art system has two deficiencies. First, the loop gain varies due to external disturbances $F(U_{10})$ making the system difficult to stabilize; and secondly, unless the loop gain is very large, the variations in the loop gain give rise to undesirable variations in the controlled variable $\theta_{10}$, as can be seen from inspection of Equation 1.08 where the loop gain is represented by the denominator of the second term in the denominator.

The operation of this system with our invention may be described by allowing the mechanical displacement $\phi_{10}$ produced by conversion element 16 to operate according to Equation 1.07 to vary $C_A$ proportional to $\phi_{10}$, and by visualizing $\beta_{10}$ as the system input rather than $E_{11}$.

An expression for the difference voltage $E_{12}$ for the new and novel system may be obtained from Equations 1.02, 1.06 and 1.07 giving $$E_{12} = \frac{1}{C_{AO} C_V} \quad (1.11)$$

It is to be noted that this value is a constant, independent of disturbances.

Although in most prior art systems the output of the difference network under steady state conditions represents the static error of the system, in the systems constructed according to this invention this is not true. Since the ouput $E_{12}$ of the difference network 11 is maintained equal to a constant by the operation of the invention, the reference input $E_{11}$ may be made equal to the sum of this constant and a value equal to the portion of the output of the measuring device 14 applied to difference network 11 when the output of the power device 13 is at the value which it is desired to maintain. Then, by the action of the feed-back control system according to our invention, the output voltage of the difference network is maintained equal to this constant, and the actual output will exactly correspond with the desired output, giving zero static error.

The loop gain $G_N$ of the system is the ratio of $E_{15}$ to $E_{12}$ with the components of the invention in operation, and therefore may be defined as:

$$G_N = \frac{E_{15}}{E_{12}} \quad (1.12)$$

Using Equations 1.01, 1.11 and 1.12, this may be rewritten as:

$$G_N = C_{AO} C_V E_{11} - 1 \quad (1.13)$$

This equation for the loop gain of the new and novel system is important in that it shows that the loop gain is constant, independent of external disturbances, thereby over-coming the first deficiency of the prior art, that of difficult loop stabilization due to loop gain variations. It may be compared to Equation 1.10 for the same system without the invention, which varies due to these disturbances.

The equation for the output variable $\theta_{10}$ may be derived from Equations 1.01, 1.04 and 1.05 to give $$\theta_{10} = \frac{1}{\beta_{10}} \cdot \frac{E_{11}}{C_M C_S} \times \left(1 - \frac{1}{C_{AO} C_V E_{11}}\right) \quad (1.14)$$

which may be rewritten in terms of the loop gain using Equation 1.13, giving:

$$\theta_{10} = \frac{1}{\beta_{10}} \cdot \frac{E_{01}}{C_M C_S} \left(\frac{1}{1 + \frac{1}{G_N}}\right) \quad (1.15)$$

Equation 1.15 shows that since the loop gain is constant, the output variable $\theta_{10}$ is constant, independent of external disturbances. This means that there will be a constant relationship between the reference input $E_{11}$ and the output variable $\theta_{10}$, independent of load, which makes the feedback control system containing our invention a zero static error system. Thus the second deficiency of the prior art, that of variation in the value of the controlled variable due to external disturbances, is eliminated.

In addition to making the loop gain constant and making the output independent of external disturbances, we have achieved in a single system the two advantages of ease of stabilization and zero static error. Each one of these two advantages may be achieved independently of the other by the prior-art devices. Proportional feedback systems have been made which have a quick response and are easy to stabilize, but these systems have a static error and the output variable has been sensitive to load variations. Integrating feedback control systems have been made in which the output variable agrees precisely with its desired value, i. e., have zero static error, but in many of these systems it has proved difficult to obtain satisfactory stabilization. In other words, the prior art has been able to achieve either one of these two advantages of our invention only by sacrificing the other advantage. It is, so far as we are aware, entirely novel to provide a system which achieves the ease of stabilization heretofore attained only in proportional feedback systems, and at the same time to obtain zero static error heretofore achieved only by integrating systems.

Inspection of Equations 1.13 and 1.15 points out a characteristic feature of the new system. If, to vary the controlled variable $\theta_{10}$, $E_{11}$ were varied in the usual manner of the prior art, the loop gain $G_N$ would vary in an undesirable manner. However, Equation 1.15 shows that $\theta_{10}$ is an inverse function of $\beta_{10}$, and since the loop gain $G_N$ is not a function of $\beta_{10}$, the output variable $\theta_{10}$ may be varied by adjusting $\beta_{10}$ without affecting the loop gain.

Figure 2:
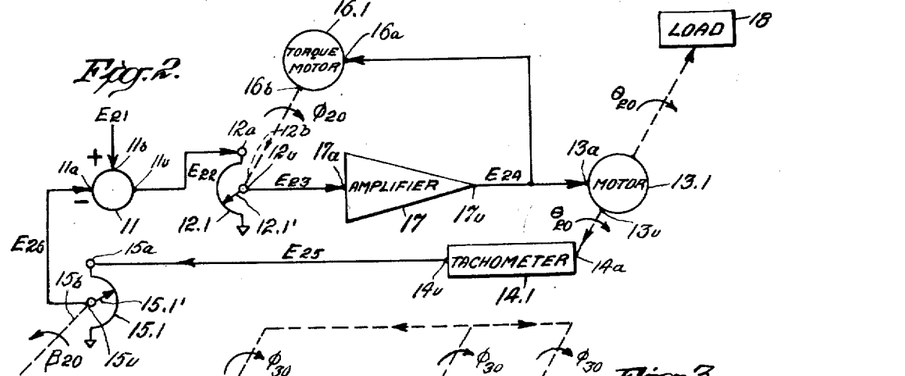
Fig. 2 shows a block diagram of the application of the invention to a simple speed regulator.

Fig. 2 illustrates the application of our invention to a speed governor. In Fig. 2, the power device to be controlled is the motor 13.1. The measuring device is a tachometer 14.1 driven by the motor and furnishing a voltage $E_{25}$ which is fed through the externally controlled fractioning device, a potentiometer 15.1 to a subtraction device 11 and then to a potentiometer 12.1, the wiper 12.1' of which is connected to the input 17a of power amplifier 17 the output 17u of which is connected to the input 13a of the motor 13.1. The voltage $E_{24}$ at the input 13a of the motor 13.1 is connected to a conversion device consisting of a torque motor 16.1. In such motors, rotation is opposed by a spring so that the rotational position of the shaft is proportional to the voltage applied. The shaft of the torque motor 16.1 is connected to the wiper 12.1' of the potentiometer 12.1 which corresponds to the multiplying element 12 shown in Fig. 1.

In the operation of this device, it will be found that changes in the external load 18 driven by the motor 13.1 cause no change in the gain of the loop, while the reference voltage $E_{21}$ applied to the subtraction device 11 is maintained constant. The controlled speed $\theta_{20}$ of the motor may be varied by an adjustment $\beta_{20}$ of the potentiometer 15.1.

The operation of the system is established by the following equations:

The output signal $E_{22}$ of the difference network 11 is $$E_{22} = (E_{21} - E_{26}) \quad (2.01)$$

where $E_{21}$ is a constant input signal and $E_{26}$ is another input signal.

$E_{24}$ is the voltage applied to the motor 13.1 and is given by $$E_{24} = A_{10} E_{23} \quad (2.02)$$

where $A_{10}$ is the amplifier gain, essentially a constant, and $E_{23}$ is the input signal to the amplifier 17.

The motor speed $\theta_{20}$ is given by $$\theta_{20} = C_{10} E_{24} \quad (2.03)$$

where $C_{10}$ is the motor coefficient in radians per volt second. The coefficient $C_{10}$ can vary widely depending on the load and the motor characteristics.

The tachometer voltage $E_{25}$ is given by $$E_{25} = K_{10} \theta_{20} \quad (2.04)$$

where $K_{10}$ is the tachometer constant in volt seconds per radian.

If $\phi_{20}$ is the fractional rotational position of the wiper 12.1' of potentiometer 12.1, the output $E_{23}$ of the potentiometer is given by $$E_{23} = \phi_{20} E_{22} \quad (2.05)$$

The rotational position of the shaft of the torque motor 16.1 can be represented by $$\phi_{20} = H_{20} E_{24} \quad (2.06)$$

where $H_{20}$ is the torque motor coefficient, essentially a constant.

Using Equations 2.02 and 2.05, the voltage $E_{22}$ is given by $$E_{22} = \frac{E_{24}}{\phi_{20} A_{10}} \quad (2.07)$$

Solving Equation 2.06 for $E_{24}$ gives $$E_{24} = \frac{\phi_{20}}{H_{20}} \quad (2.08)$$

Substituting $E_{24}$ from Equation 2.08 into Equation 2.07 gives $$E_{22} = \frac{1}{A_{10} H_{20}} \quad (2.09)$$

Inspection of Equation 2.09 shows that the magnitude of the difference voltage $E_{22}$ is a constant, independent of load. The static error is therefore zero.

From the foregoing it can be seen that by the addition of the potentiometer 12.1 and torque motor 16.1 in the manner indicated we have made the output of the differencing network 11 constant and independent of the load 18. This means that there will be a constant relationship between the reference input $E_{21}$ and the motor speed $\theta_{20}$, independent of load, which makes the feedback control system of Fig. 2 a zero static error system.

The addition of the externally controlled fractioning element of the invention, the potentiometer 15.1 can be described by $$E_{26} = \beta_{20} E_{25} \quad (2.10)$$

where $\beta_{20}$ is the fractional rotational position of the wiper arm 15.1' of the potentiometer 15.1 and $E_{25}$ is the signal input to the potentiometer.

The loop gain may be defined as the ratio of $E_{26}$ to $E_{22}$, giving $$G_{20} = \frac{E_{26}}{E_{22}} \quad (2.11)$$

Applying Equations 2.01, 2.09 and 2.11 the loop gain becomes:

$$G_{20} = A_{10} H_{20} E_{21} - 1 \quad (2.12)$$

Since all the factors of all the terms on the right-hand side of the above equation are constants independent of load, the loop gain is constant, independent of load. Since no integrations have been introduced, stabilization of the control system is simplified.

The motor speed equation may be written from Equations 2.01, 2.04 and 2.10 as $$\theta_{20} = \frac{E_{21}}{\beta_{20} K_{10}} \left(1 - \frac{1}{A_{10} H_{20} E_{21}}\right) \quad (2.13)$$

which may be rewritten in terms of the loop gain, using Equation 2.12 as $$\theta_{20} = \frac{E_{21}}{\beta_{20} K_{10}} \left(\frac{1}{1 + \frac{1}{G_{20}}}\right) \quad (2.14)$$

Equation 2.12 above shows that the loop gain $G_{20}$ of the system of Fig. 2 is a constant, independent of the load 18, the motor speed $\theta_{20}$, or such value $\beta_{20}$ of the adjustment of the externally controlled fractioning element, potentiometer 15.1, as is desired.

Equation 2.14 above shows that the motor speed $\theta_{20}$ is independent of the load 18 but may be varied by adjusting the externally controlled fractioning element, potentiometer 15.1.

It is clear from this analysis that our invention has eliminated the two major deficiencies of the prior art; difficult loop stabilization due to loop gain varying with load, and motor speed varying with load.

Figure 3:
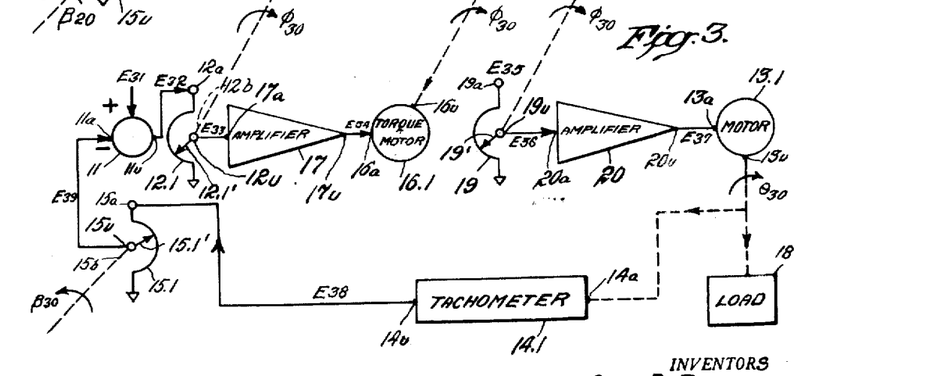
Fig. 3 shows a modification of Fig. 2.

Fig. 3 shows a speed control system generally similar to that shown in Fig. 2. The difference is that the voltage at input 13a of the load-driving motor 13.1 is obtained from an external source $E_{35}$ and is controlled by the torque motor 16.1 instead of by direct application of a fraction of the difference voltage to an amplifier connected to the input of the load-driving motor. The load-driving motor 13.1 is driven from a source of constant voltage $E_{35}$ connected through a potentiometer 19 and an amplifier 20 to the input 13a of the load-driving motor 13.1, and the torque motor 16.1 is driven from the output 12u of potentiometer 12.1 connected through amplifier 17. The shaft of torque motor 16.1 which turns proportionately to a fraction $E_{33}$ of the difference voltage $E_{32}$, as in Fig. 2, is connected not only to the wiper 12.1' of the potentiometer 12.1 but also to the wiper 19' of the potentiometer 19. As a result, the voltage applied to the load-driving motor is proportional to the controlling voltage $E_{33}$, as in the case of the direct connection shown in Fig. 2. The torque motor 16.1 and its connections to the potentiometers 12.1 and 19 provide a convenient mechanism by which the control voltage $E_{33}$ simultaneously and proportionately controls both the input to the adjusting torque motor 16.1 and the input to the load-driving motor 13.1.

This system operates in similar way to the system of Fig. 2 and may be described by similar equations. It has the same inherent advantages and allows the use of an external source of power $E_{35}$ for driving the motor 13.1.

To insure stability of the systems shown in Figs. 2 and 3 it is generally desirable to design the circuit of amplifier 17 to have a delay period greater than any delay period inherent in the feedback path from the amplifier output $17u$ to the multiplying element input $12b$.

The particular embodiments of our invention previously described show that the invention effects important improvements in governing or speed-regulating mechanisms. A great value of our invention, however, lies in a different field, namely, in its application to electro-mechanical vibration exciters.

In testing the effect of vibration on airplane parts and accessories and other devices, it is customary to use an electro-mechanical vibration generator for vibrating a table on which the specimen is placed. Many vibration tests require a cyclic variation of frequency of vibration, while maintaining constant either the displacement, velocity or acceleration of the vibrating member. To make such tests, it has heretofore been necessary to make continual manual readjustment of the displacement, velocity or acceleration of the vibrating member. Since these tests continue over many hours, the continual manual readjustment is extremely fatiguing to the operator and is often inaccurate and unsatisfactory. Prior to our invention, the available means for precise control of the operation of electro-mechanical vibration exciters have been unsatisfactory. For reasons hereinafter explained, ordinary feedback control systems are inadequate to control vibration exciters.

Many electro-mechanical vibration generators now in use have a fixed field energized by direct current and a driver coil supplied with alternating current which is located in an air gap of the field structure and is attached to a reciprocating armature. A table for mounting specimens is attached to the armature, and the table is provided with a signal generator which in most cases produces an alternating voltage proportional to the velocity of the table. In testing specimens on such a table it is usually desirable to determine the effects of vibrations of different frequencies in which the acceleration of the table or the displacement of the table is maintained constant. By applying the signal from the signal generator to a differentiating amplifier or to an integrating amplifier and then to a rectifier or detector, a D. C. signal is obtained which represents either the acceleration or the displacement of the table. Because of changes in the frequency of the input current to the vibration exciter and changes in the load on the table, the output signals representing these characteristics of table movement vary irregularly with variations in the input or driving voltage. Heretofore, indicators representing acceleration and displacement have been driven by the signal generator and attempts have been made to regulate the input voltage to the exciter manually in such a way as to maintain the needle of one or the other of these indicators stationary during tests involving changes in the frequency of the vibration. Such attempts have proved unsatisfactory.

Ordinary feedback control systems cannot be used to control the input voltage so as to maintain the output signal representing table acceleration constant or to maintain the output signal representing table displacement constant. The reason for this is that the transfer function of a vibration exciter is subject to wide variation so that on changes in frequency which bring the table and its load nearer to or further from a condition of resonance, the transfer function of the vibration exciter may vary through a range of 1,000 to 1. It follows that if the difference between the output signal and a fixed voltage corresponding to the desired table acceleration or displacement is used to drive a motor for controlling the input voltage as in an ordinary feedback control system, the results are unsatisfactory. The adjusting voltage is at times too low to drive the control motor fast enough to obtain accurate control and at other times it is too high and causes hunting of the feedback control system.

The feedback control system which we have invented avoids these difficulties by the arrangement in which the control motor not only adjusts the input voltage to the shaker but at the same time adjusts the adjusting voltage applied to the control motor so as to keep the loop gain constant.

Figure 4:
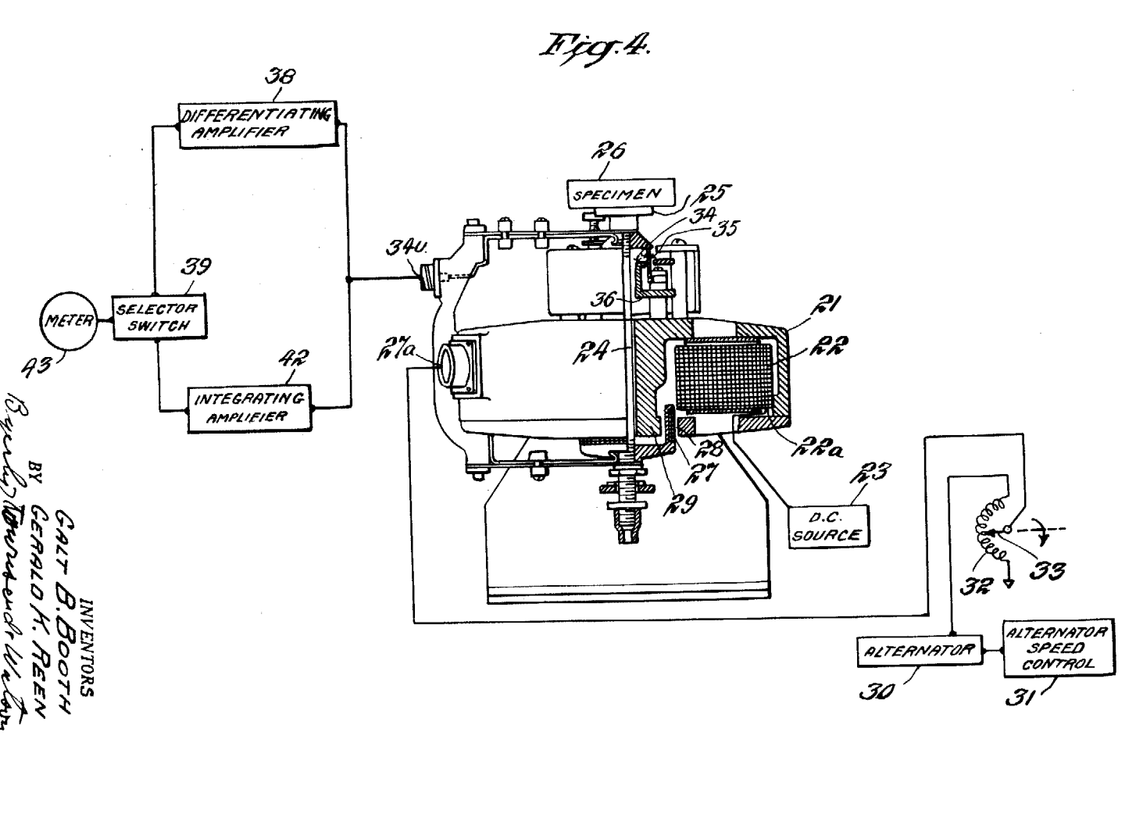
Fig. 4 shows a manually controlled vibration exciter system to which the invention may be applied.

Fig. 4 shows a vibration exciter or shaker 21 with a fixed field 22 to which direct current is applied at its input $22a$ from a source 23 and with a reciprocating armature 24 which carries the table 25 adapted to support a specimen 26 and a driver coil 27, located in the air gap 28 of the field magnet structure 29 which is supplied at its input $27a$ with an alternating current from an alternator 30 through an adjustable autotransformer 32 having a slide 33 whose movements adjust the voltage of the input current. The alternator from which the input current is obtained has a variable speed drive 31 which may be regulated manually or otherwise to vary the frequency of the table vibrations.

On the table is mounted a signal generator or sensing device 34 which consists of a coil 35 moved with the table and a fixed magnet 36.

The particular sensing device shown generates a voltage proportional to the velocity of the table motion. Other sensing devices which generate a voltage proportional to table acceleration or displacement may be used. The output of the coil 35 is led to the connector $34u$ which is connected to a differentiating amplifier 38 and an integrating amplifier 42. The output of the differentiating amplifier 38, which is proportional to the acceleration of the table, and the output of the integrating amplifier 42, which is proportional to the displacement of the table, are led to the selector switch 39 which connects either of the amplifiers to the indicating meter 43 which gives a visual indication of the table acceleration or displacement.

The combination of the velocity type signal generator 34 with the differentiating amplifier 38 may be termed an acceleration transducer, i. e. it produces a voltage proportional to the acceleration of the table. Similarly, if the integrating amplifier 42 is used, the combination would be a displacement transducer. If neither amplifier is used, the signal generator 34 itself may be termed a velocity transducer. Such transducers have heretofore been used with vibration exciters and are available in different forms.

Figure 5:
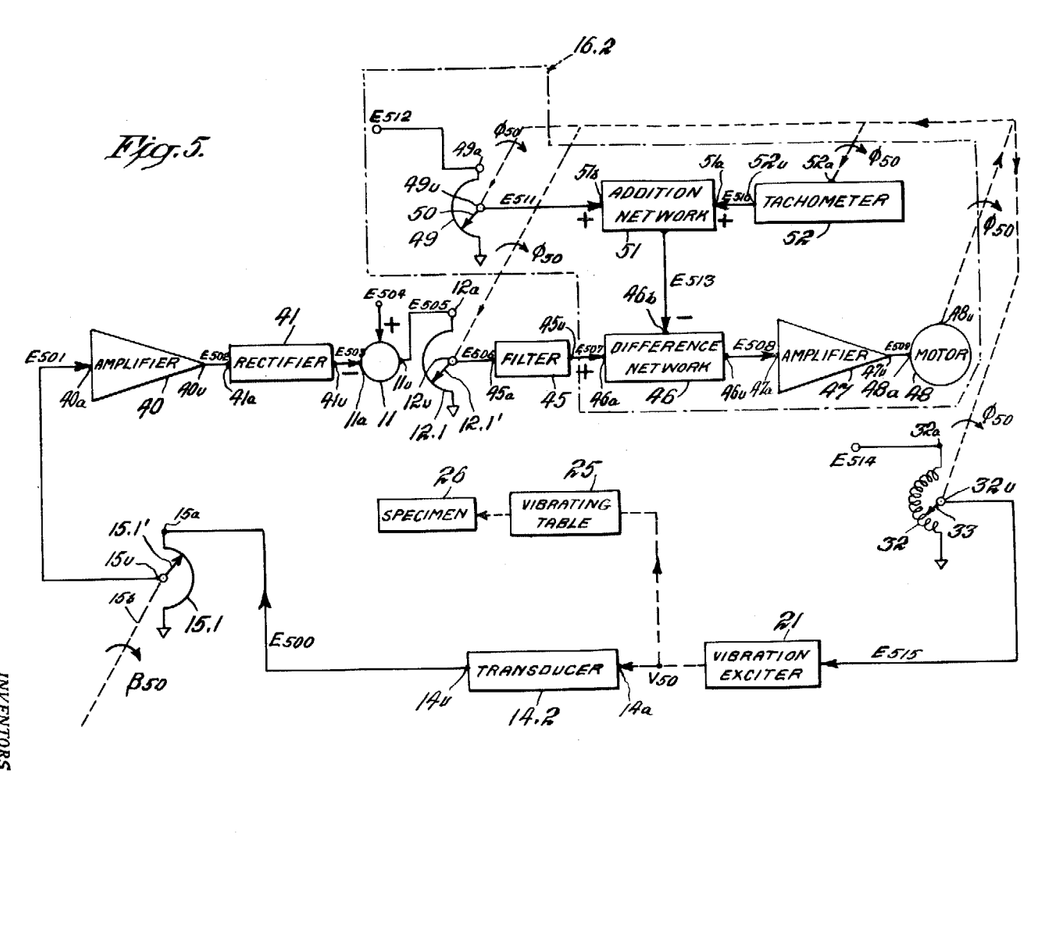
Fig. 5 shows in schematic form the application of the invention in a feedback control system for the vibration exciter of Fig. 4.

Fig. 5 shows in schematic form the application of a feedback control system incorporating the invention to the vibration exciter of Fig. 4. With the system of Fig. 5, it is possible to automatically maintain constant the amplitude of the displacement, velocity, or acceleration of the table 25 and the specimen 26 notwithstanding the tremendous variations in the transfer function of the exciter 21 and the wide variations in the supply voltage $E_{514}$.

Fig. 5 illustrates an automatic device for making vibration tests. In Fig. 5 the power element is an electro-mechanical vibration exciter 21 which is driven by an A. C. voltage $E_{514}$ from an autotransformer 32 and which is provided with a vibrating table 25 to which may be attached a specimen 26. The measuring device 14.2 is a transducer comprising the following elements from Fig. 4: a velocity signal generator 34 attached to the vibrator table 25 and an amplifier 38 or amplifier 42, depending on the position of switch 39; and is adapted to produce a signal, proportional to a characteristic of the motion of the table 25, which is fed through a potentiometer 15.1, an amplifier 40, and a rectifier 41 to a subtraction element 11 and then to the input 12a of a potentiometer 12.1, the output 12u of which is connected through a filter 45, a difference network 46, an amplifier 47 to the input 48a of a motor 48, the shaft of which is connected to the wiper 33 of the autotransformer 32.

The wiper 33 of autotransformer 32 is connected through the shaft of motor 48 to a tachometer 52, to the wiper 50 of a potentiometer 49 and to wiper 12.1′ of potentiometer 12.1. The voltages at the output 49u of potentiometer 49 and at the output 52u of tachometer 52 are each applied to the addition network 51, the output of which is applied to input 46b of difference network 46.

The elements 47, 48, 49, 51, 52 and 46 form a typical positional or displacement servomechanism 16.2 known to the prior art which produces a rotational shaft position $\phi_{50}$ proportional to an input voltage $E_{507}$.

The operation of this displacement servomechanism 16.2 may be briefly summarized as follows: a differencing network 46 compares the input voltage $E_{507}$ which is the output voltage from the filter 45 to a feedback voltage $E_{513}$ and applies the difference voltage $E_{508}$ to a power amplifier 47 which drives the motor 48. The motor 48 produces a rotational position $\phi_{50}$ of its shaft which is coupled to a tachometer 52 and to the wipers 50 and 12.1′ of potentiometers 49 and 12.1. Potentiometer 49, to which a constant voltage $E_{512}$ is applied, produces a voltage $E_{511}$ at the potentiometer wiper arm 50 proportional to the rotational position $\phi_{50}$ of the shaft of motor 48. A voltage $E_{510}$ from the tachometer 52 is proportional to the rate of change of the rotational position $\phi_{50}$ of the shaft of motor 48. In the addition network 51, the tachometer voltage $E_{510}$ is added to the voltage $E_{511}$ from the potentiometer wiper arm 50 to produce the feedback voltage $E_{513}$.

When the motor 48 is at rest, the voltages $E_{508}$ and $E_{510}$ are zero. The input voltage $E_{507}$ is equal to the feedback voltage $E_{513}$ which equals the voltage $E_{511}$ at the output 49u of the potentiometer 49. Since the voltage $E_{511}$ at the wiper 50 of the potentiometer 49 is proportional to the rotational position $\phi_{50}$ of the shaft of motor 48, the input voltage $E_{507}$ is proportional to the rotational position $\phi_{50}$ of the shaft of motor 48. This relationship may be expressed as $$\phi_{50}=Z_{50}E_{507} \qquad (5.01)$$

where $Z_{50}$ is a constant of proportionality for the low system signal frequencies of interest.

The tachometer 52, which is added to provide damping to the positional servomechanism described above, may be omitted for certain types of servomotors or alternate methods of stabilization may be used.

Proceeding now to the complete system, the shaft of motor 48 drives the wiper 33 of autotransformer 32 and adjusts the driving voltage $E_{515}$ to the exciter 21. The vibration amplitude $V_{50}$ of the table 25 and specimen 26 is measured by the transducer 14.2 which produces a proportional electric signal $E_{500}$. A portion of the voltage $E_{500}$, proportional to the shaft rotational position $\beta_{50}$ of the shaft of potentiometer 15.1, is applied to the amplifier 40 which in turn drives the full wave rectifier 41. The output voltage $E_{503}$ of the rectifier 41 is a continuous succession of half sinusoidal pulses with a fundamental frequency twice that of the driving voltage $E_{514}$. The rectifier output voltage $E_{503}$ is subtracted from the fixed reference direct voltage $E_{504}$ in the differencing network 11. The difference voltage $E_{505}$ is applied to the multiplying element, potentiometer 12.1, which produces a voltage $E_{506}$ at the wiper arm 12.1′ proportional to the product of the difference voltage $E_{505}$ and the rotational position $\phi_{50}$ of the shaft of motor 48. The filter 45 removes the alternating component from the wiper arm voltage $E_{506}$ producing a direct voltage $E_{507}$ which acts as the input voltage for the aforementioned displacement servomechanism 16.2.

The operation of these elements may be summarized by Equations 5.02 through 5.10.

The voltage $E_{515}$ applied to the vibration exciter 21 is given by $$E_{515}=\phi_{50}E_{514} \qquad (5.02)$$

where $E_{514}$ varies over wide margins.

The vibratory motion $V_{50}$ is given by $$V_{50}=C_{S50}E_{515} \qquad (5.03)$$

where $C_{S50}$ varies radically due to resonances in the vibrating members.

The voltage $E_{500}$, proportional to that function of the motion $V_{50}$ desired held constant, is given by $$E_{500}=T_{50}V_{50} \qquad (5.04)$$

where $T_{50}$ is the function desired.

The performance of the externally controlled fractioning element, potentiometer 15.1, is described by $$E_{501}=\beta_{50}E_{500} \qquad (5.05)$$

where $\beta_{50}$ is the fractional rotational position of the wiper arm 15.1′ of the potentiometer 15.1 used to adjust the desired amplitude of the function of specimen motion which the system is designed to hold constant.

The action of the amplifier 40 is given by $$E_{502}=A_{50}E_{501} \qquad (5.06)$$

where $C_{R50}$ is a constant.

The relationship between the direct component of the voltage $E_{503}$ and the input voltage $E_{502}$ to the rectifier 41 is given by $$E_{503}=C_{R50}E_{502} \qquad (5.07)$$

where $C_{S50}$ is a constant.

The performance of the differencing network 11 is described by $$E_{505}=E_{504}-E_{503} \qquad (5.08)$$

The action of the multiplying element, potentiometer 12.1, is given by $$E_{506}=\phi_{50}E_{505} \qquad (5.09)$$

The performance of the filter 45 is described by $$E_{507}=C_{F50}E_{506} \qquad (5.10)$$

where $C_{F50}$ is the transfer function of a low pass filter designed for a pass band from 0 to 10 C. P. S. and 70 db attenuation above 20 C. P. S. $C_{F50}$ is a constant. The filter output voltage $E_{507}$ serves as the input to the displacement servomechanism whose operation is described by Equation 5.01.

From Equations 5.01, 5.09, and 5.10 the output $E_{505}$ of the difference network 11 is given by $$E_{505}=\frac{1}{C_{F50}Z_{50}} \qquad (5.11)$$

a constant under steady state or low system signal frequency conditions. As is discussed relative to Equation 1.11, this means that the system has zero steady state error.

The loop gain $G_{50}$ is the ratio of the voltages and $E_{505}$ and is defined by $$G_{50}=\frac{E_{503}}{E_{505}} \qquad (5.12)$$

Using Equations 5.08, 5.11, and 5.12, the loop gain may be rewritten as $$G_{50}=C_{F50}Z_{50}E_{504}-1 \qquad (5.13)$$

which is constant for steady state or low system signal frequency conditions. It should be noted that the loop gain is independent of external disturbances to the control system such as resonances in the vibrating elements, variations in the amplitude or frequency of the supply voltage $E_{514}$, or adjustments of the externally controlled fractioning element, potentiometer 15.1. The fact that the loop gain is essentially constant simplifies the problem of feedback loop stabilization.

The voltage $E_{500}$ is directly proportional to that function of the motion of the specimen which the system is designed to hold constant. An expression for the voltage $E_{500}$, which describes the performance of the system, may be obtained from Equations 5.05, 5.06, 5.07, 5.08, 5.11, and 5.13 giving $$E_{500} = \frac{E_{504}}{\beta_{50}A_{50}C_{R50}} \frac{1}{\left(1+\frac{1}{G_{50}}\right)} \quad (5.14)$$

An examination of Equation 5.14 shows that the motion of the vibrating members at the location which the transducer 14.2 monitors is independent of resonances in the vibrating members and variations of the amplitude or frequency of the supply voltage $E_{514}$. It may also be noted that the amplitude of the chosen function of vibrating motion may be readily adjusted by varying the rotation $\beta_{50}$ of the externally controlled fractioning element, potentiometer 15.1.

When the vibration exciter is used to run vibration tests, it is desirable to vary the frequency of table motion over the frequency range from 10 cycles per second to 2000 cycles per second. With respect to the control system, this frequency may be termed the carrier frequency, and appears at all elements in the control system between the variable transformer 32 and the rectifier 41. Disturbances in the control system, which may be termed system signal frequencies, appear as variations in the magnitude of the carrier frequency. In normal operation system signal frequencies will be less than 5 cycles per second. As discussed below our system will respond adequately at a system signal frequency of 10 cycles per second.

To compare the feedback voltage $E_{503}$ with a reference $E_{504}$ and use the difference $E_{505}$ to actuate the motor 43 which readjusts the input to the vibration exciter 21, it is necessary to convert the carrier frequency voltage to a direct voltage by means of the rectifier 41 and the filter 45. The system signal frequency then appears as the variations in the magnitude of the direct voltage $E_{507}$.

The filter 45 is introduced to insure correct and stable operation of the position servomechanism 16.2 by excluding from such mechanism the harmonics of the carrier frequency remaining in the output $E_{503}$ of the rectifier 41. In order to attenuate harmonics of the carrier frequency, that is, the frequency applied to the driver coil of the vibration exciter 21 when that frequency is as low as 10 cycles per second, it is necessary to use a filter which will cause some delay at system signal frequencies. Thus, the filter 45 which has been described in connection with Equation 5.10 has characteristics similar to those of a delay line with a lag of 0.07 second. This filter introduces little attenuation to system signal frequencies below 10 cycles per second and causes a minimum of phase shift which does not reach 180 degrees until a system signal frequency of 10 cycles per second is reached.

A physical system, embodying the invention in the form of Fig. 5, has been constructed. The system has a response time of 0.1 second at a carrier frequency of 10 cycles per second with essentially zero overshoot. As is described with reference to Fig. 5, the system has zero steady state error and constant loop gain.

To complete the disclosure of our invention we have added Figs. 6 through 9a, showing the physical construction of the essential mechanical parts of the apparatus which we use to perform the mechanical operations shown schematically in Fig. 5.

Figure 6:
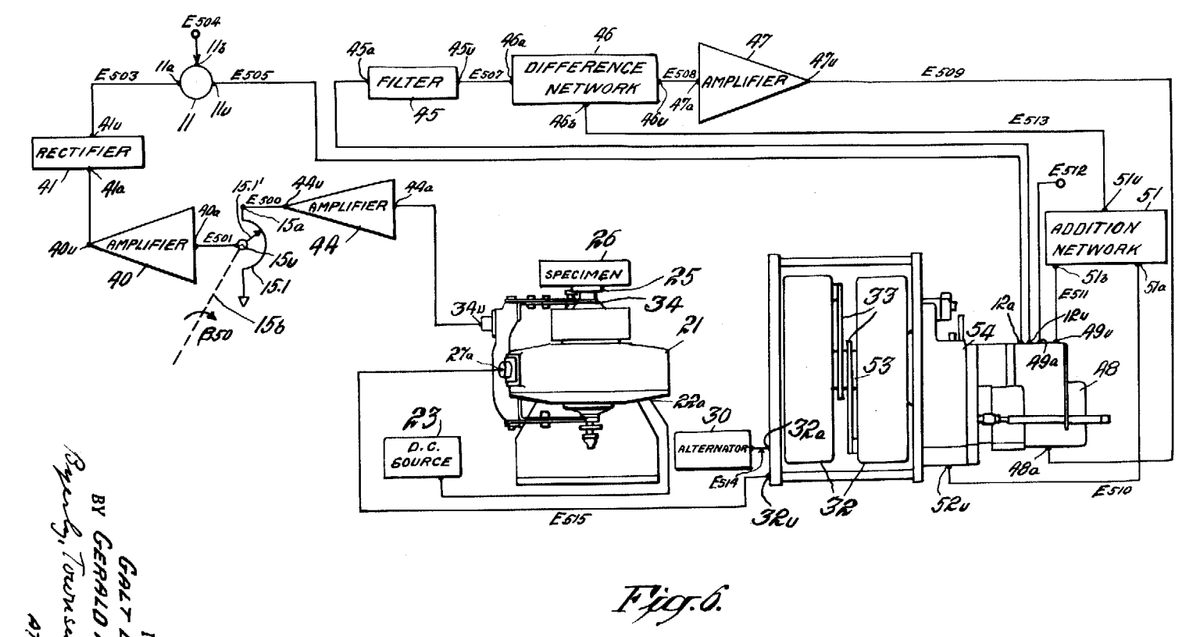
Fig. 6 shows the actual relationships between the mechanical elements shown in schematic form in Fig. 5.

Fig. 6 shows a vibration exciter 21, to which is connected table 25 which supports a specimen 26. Also connected to the vibration exciter 21 is a signal generator 34. Vibration exciter 21 is connected to the output 32u of an autotransformer 32 which is supplied with an A. C. voltage from an alternator 30 through its input, 32a. Vibration exciter 21 is also supplied with D. C. voltage from a D. C. source 23. A wiper 33 of the autotransformer 32 is connected to a rotatable shaft 53 which is supported by a gear box 54 which contains and provides support for two potentiometers 12.1 and 49, motor 48 and tachometer 52 which are shown in block form in Fig. 5. With the exception that these last named elements are not visible in Fig. 6, but are contained within gear box 54, the electrical paths, insofar as they may be shown in Fig. 6, are the same as those in Fig. 5. It should be noted that signal generator 34 and amplifier 44 shown in Fig. 6 correspond to transducer 14.2 shown in Fig. 5.

Figure 7:
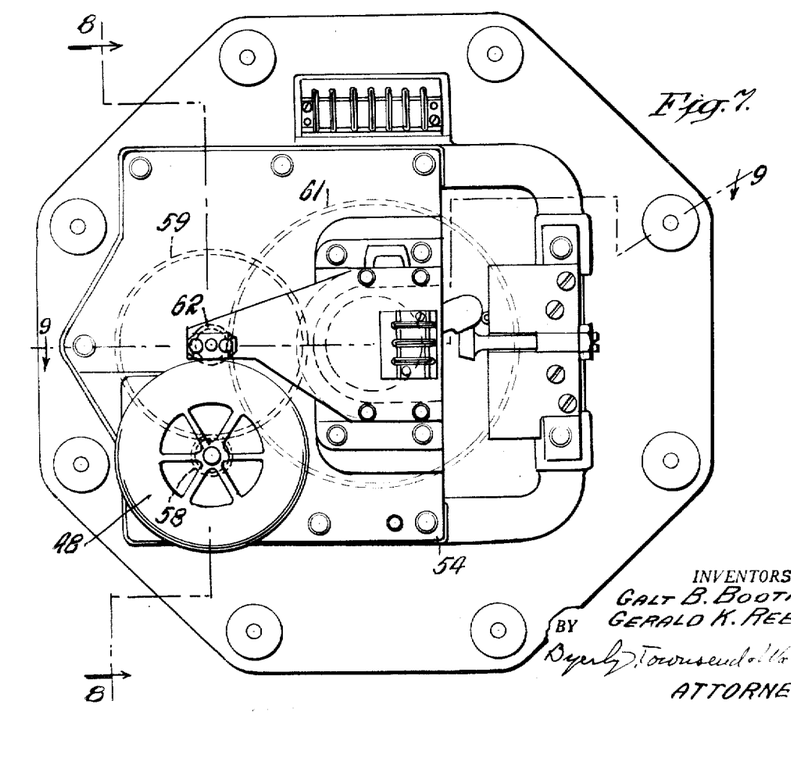
Fig. 7 shows an enlarged end view of the gear box shown in Fig. 6.
Figure 8:
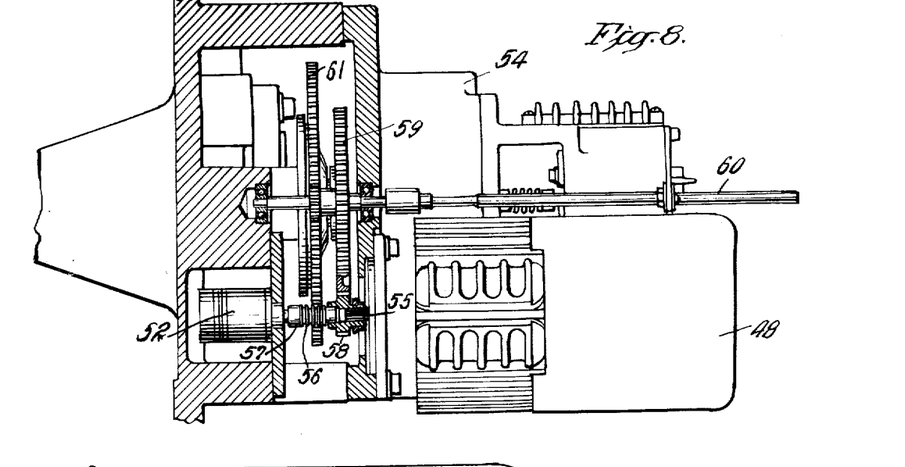
Fig. 8 is a section on a line 8—8 of Fig. 7.
Figures 9, 9A:
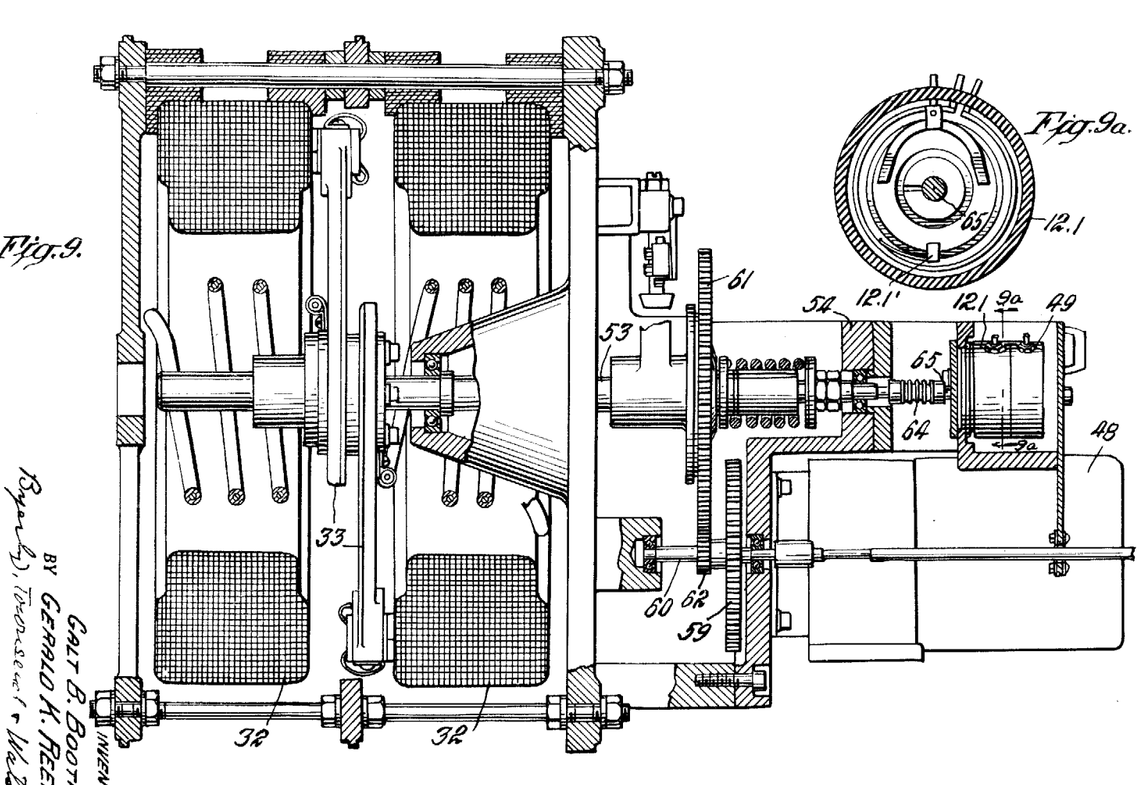

Fig. 7 is an end view of the gear box shown in Fig. 6 the purpose of which is to show the basis for the sections shown in Figs. 8 and 9.

Fig. 8 shows a section of gear box 54 which supports a rotatable shaft 55 driven by the motor 48. A flexible coupling 56 connects shaft 55 to another rotatable shaft 57, also supported by gear box 54, which drives tachometer 52. Also connected to shaft 55 is a gear 58 which drives a gear 59 connected to a rotatable shaft 60 supported by gear box 54, which is also shown in Fig. 9.

Fig. 9 shows a section view of the autotransformer 32 showing the construction of the parts comprising wiper 33 together with the manner of their attachment to shaft 53. Shaft 53 is driven by shaft 60 through a gear 61, attached to shaft 53 which is driven by gear 62, attached to shaft 60. At the opposite end of shaft 53 from autotransformer 32 is attached a flexible coupling 64 which connects said shaft 53 to a shaft 65, which is supported by gear box 54 and to which are connected the wipers 12.1' and 50 of the potentiometers 12.1 and 49.

Fig. 9a shows a section of potentiometer 12.1 indicating the relationship of the wiper 12.1' to it and to shaft 65. The same structure and relationships are applicable to potentiometer 49, although the wiring should be as indicated in Fig. 5.

The operation of mechanical parts above described with reference to Figs. 6 through 9a is as follows:

An error signal applied to motor 48 causes motor shaft 55 to rotate thereby turning gear 58, which is attached to it, and also through flexible coupling 56, shaft 57 which drives tachometer 52 thereby giving rise to a signal at 52u.

The gear 58 turns gear 59 on shaft 60 thereby also turning gear 62 also attached to shaft 60. Gear 62 turns gear 61 mounted on shaft 53 the turning of which effects appropriate adjustment of autotransformer 32 and potentiometers 12.1 and 49 by appropriate rotation of their respective wipers 33, 12.1' and 50, thereby giving rise to signals at 32u, 12u and 49u respectively. These signals and the signal at 52u are applied to the circuit shown in Fig. 5 in the manner previously described.

As an aid to those persons seeking to practice the invention in the form of Figs. 5–9a, certain preferred methods of construction may be noted. It is of the utmost importance that the potentiometers 49 and 12.1 have a high degree of linearity to give satisfactory performance at low values of $\phi_{50}$. The main power control device, the autotransformer 32, may have very loose linearity specifications, since the deviations from linearity of the autotransformer affect only the loop gain.

The accuracy of control depends heavily upon the response of the small displacement servomechanism 16.2 which produces the shaft rotation $\phi_{50}$ proportional to the voltage $E_{507}$. The response of this inner control loop from the filter output 45u to the multiplying element input 12b should be much more rapid than the desired response of the overall system. This may be facilitated by a mechanical construction as shown in Figs. 6–9 which holds backlash to a minimum. We have found that backlash of the order of .01 percent of the maximum value of $\phi_{50}$ provides satisfactory response if the shaft 57 of the damping tachometer 52 is coupled directly to the shaft 55 of the servomotor 48, through a flexible coupling 56, rather than to shaft 53 at the slow speed end of the gear train described in detail with reference to Figs. 7–9.

To eliminate drift of this inner control loop from filter output 45u to multiplying element input 12b we have found it desirable to use as the difference network 46 a D. C. to A. C. converter of the vibrating reed type which produces an alternating voltage of 60 cycles per second proportional to the difference of the voltages at the two difference network inputs 46a and 46b. The amplifier 47 may then be an A. C. amplifier and the motor 48 may be a two-phase 60 cycles per second servomotor of a common type.

Since the response of the system may be made rapid without the use of high loop gain, we have found it convenient to use a loop gain of unity which completely eliminates all possibility of instability.

What is claimed is:

1. Controlling means for a power element comprising means providing a path from the output side of the power element to the input side of the power element containing in series a subtraction element and a multiplying element, and means providing an internal feedback connection from the input side of the power element to the multiplying element to make its transfer function proportional to the input of the power element.

2. Means for controlling a power element producing an output signal, comprising a subtraction element having one of its inputs connected to the output side of the power element responsive to said output signal and the other of its inputs connected to means providing a constant level signal, a multiplying element having one of its inputs connected to the output of the subtraction element and its output connected to the input side of the power element, and means providing a feedback connection from the input side of the power element to the other input of the multiplying element so that the signal led to the input of the power device is the product of the difference signal from the subtraction element by a value proportional to the input to the power element.

3. Controlling means for a power element as claimed in claim 2, in which the multiplying element consists of a potentiometer having a resistance connected across the output of the subtraction element and a mechanical wiper connected to the input side of the power element, and the feedback connection from the input side of the power element to the multiplying device comprises a torque motor electrically connected between the output of the potentiometer and the input side of the power element and mechanically connected to the wiper of the potentiometer.

4. Means for controlling a power element as claimed in claim 2, in combination with an externally operated fractioning element inserted in the feedback path between the output side of the power element and the subtraction element to permit changing the output of the power element without changing the constant level signal applied to the subtraction element and without changing the loop gain of the feedback control system.

5. Means for controlling a power element as claimed in claim 2, in which a measuring device for measuring a characteristic of the output of the power element is connected in the feedback path between the output side of the power element and subtraction element.

6. Means for controlling a power element producing an output signal, comprising a mechanical control device for the input of the power element, a multiplying element having its output connected to the input of said control device, a subtraction element having one of its inputs connected to the output side of the power element responsive to said output signal and the other of its inputs connected to means providing a constant level signal and having its output connected to the multiplying element, and means providing a feedback path from the control device to the multiplying element, so that the signal which is led to the control device is the product of the difference signal from the subtraction element by a value proportional to the movement of the control device in controlling the input to the power element.

7. A feedback control system for a power element comprising means for obtaining a difference signal from the output side of the power element, means for applying a fraction of this difference signal to a regulating motor, and mechanical connections from the motor to adjust proportionately the input to the power element and the proportion of the difference signal applied to the regulating motor.

8. An automatic device for making vibration tests, comprising an electro-mechanical vibration exciter, a test table operated by said exciter, source of A. C. current for operating the exciter, a device for controlling the voltage of said A. C. current, a transducer connected to the table and adapted to produce an electric signal proportional to a characteristic of the motion of the table, a subtraction element having one of its inputs connected to the output of the transducer and its other input connected to a source of constant voltage, a multiplying device connected to the output of the subtraction element, a connection from the output of the multiplying device to the input of the device for controlling the voltage of the A. C. current supplied to the exciter, and means providing a feedback path from the output of said controlling device to the multiplying device to adjust the output thereof in direct proportion to the output of the controlling device.

9. An automatic device for vibration testing, comprising an electro-mechanical vibration exciter, a testing table connected to the exciter, a source of alternating current for operating the exciter, a fractioning transformer connected between said source and the input of the exciter, a transducer connected to the table and adapted to provide an electric signal proportional to a characteristic of the motion of the table, means for comparing the output of the transducer with a signal of fixed voltage to obtain a difference voltage, a potentiometer having its input connected to receive said difference voltage, displacement servomechanism connected to the output of said potentiometer and arranged to cause a shaft movement proportional to the voltage applied to it, and mechanical connections between the output shaft of the servomechanism and the wipers of the potentiometer and the fractioning transformer to cause simultaneous and corresponding movement thereof.

10. A device as claimed in claim 8, in which an externally controlled potentiometer is inserted between the output of the transducer and the subtraction device and independent means are provided for changing the frequency of the alternating current supplied to the exciter.

11. An automatic device for vibration testing, comprising an electro-mechanical vibration exciter, a testing table connected to the exciter, means for supplying alternating current to the exciter to operate it, a transducer connected to the table and adapted to provide an electric signal proportional to a characteristic of the motion of the table, subtraction means for obtaining a difference voltage from the transducer, means for applying a fraction of this difference voltage to a regulating motor, and mechanical connections from the motor to adjust simultaneously and proportionately a supply of alternating current to the exciter and the fraction of the difference voltage applied to the motor.

12. Controlling means for a power element as claimed in claim 2, in which the multiplying element consists of a potentiometer having a resistance connected across the output of the subtraction element and a mechanical wiper connected to the input side of the power element, and the feedback connection from the input side of the power element to the multiplying device comprises a displacement servomechanism electrically connected between the output of the potentiometer and the input side of the power element and mechanically connected to the wiper of the potentiometer.

References Cited in the file of this patent

UNITED STATES PATENTS

| | | |
|---|---|---|
| 2,287,406 | Baird | June 23, 1942 |
| 2,297,084 | Swallow | Sept. 29, 1942 |
| 2,523,046 | Montgomery | Sept. 19, 1950 |

UNITED STATES PATENT OFFICE
CERTIFICATE OF CORRECTION

Patent No. 2,853,667                                    September 23, 1958

Galt B. Booth et al.

It is hereby certified that error appears in the printed specification of the above numbered patent requiring correction and that the said Letters Patent should read as corrected below.

Column 4, line 38, for "$\phi_{10}$" read -- $\theta_{10}$ --; column 10, lines 67 and 68, for "attache da" read -- attached to --; column 12, line 28, for "$C_{R50}$" read -- $A_{50}$ --; line 34, for "$C_{S50}$" read -- $C_{R50}$ --.

Signed and sealed this 9th day of June 1959.

(SEAL)
Attest:

KARL H. AXLINE                                         ROBERT C. WATSON
Attesting Officer                                     Commissioner of Patents